United States Patent [19]

DeForest et al.

[11] Patent Number: 4,908,876
[45] Date of Patent: Mar. 13, 1990

[54] APPARATUS AND METHOD FOR ENHANCEMENT OF IMAGE VIEWING BY MODULATED ILLUMINATION OF A TRANSPARENCY

[75] Inventors: Sherman E. DeForest, Del Mar; Saied Benyamin, Solana Beach; Richard G. Hier, Poway, all of Calif.; Robert A. Kruger; Robert L. Power, both of Salt Lake City, Utah; Gregory W. Schmidt, Olivenhain; William A. Schmidt, Encinitas, both of Calif.

[73] Assignee: Digivision, Inc., San Diego, Calif.

[21] Appl. No.: 169,602

[22] Filed: Mar. 16, 1988

[51] Int. Cl.⁴ .................................... G06K 9/40
[52] U.S. Cl. ............................ 382/54; 382/32; 382/31; 382/6; 358/111; 350/331 R
[58] Field of Search .................. 382/54, 32, 31, 6; 378/99; 358/111; 350/331 R, 333, 342; 40/361, 362, 363, 364, 365, 366, 367

[56] References Cited

U.S. PATENT DOCUMENTS

| | | | |
|---|---|---|---|
| 3,953,764 | 4/1976 | Miller et al. | 40/361 |
| 4,315,318 | 2/1982 | Kato et al. | 382/6 |
| 4,637,150 | 1/1987 | Geluk | 40/361 |
| 4,715,683 | 12/1987 | Gregory et al. | 350/331 R |
| 4,747,052 | 5/1988 | Hishinuma et al. | 358/111 |
| 4,772,101 | 9/1988 | Liu | 350/331 R |
| 4,794,531 | 12/1988 | Morishita et al. | 358/111 |

Primary Examiner—Leo H. Boudreau
Assistant Examiner—Michael Razavi
Attorney, Agent, or Firm—Brown, Martin, Haller & McClain

[57] ABSTRACT

The human-eye viewing of an image on a transparency is enhanced by adaptively modulating illumination of the transparency with an unsharp, complementary representation of the image.

10 Claims, 3 Drawing Sheets

APPARATUS AND METHOD FOR ENHANCEMENT OF IMAGE VIEWING BY MODULATED ILLUMINATION OF A TRANSPARENCY

FIELD OF THE INVENTION

The invention is in the field of transparency image viewing, and, more particularly, concerns the enhancement of lightbox display of a transparency through modulation of the viewing light used to illuminate the transparency. The modulation is in the form of an unsharp, complementary representation of the transparency image being viewed.

BACKGROUND OF THE INVENTION

Accurate interpretation of X-ray film images is crucial in medical diagnostics. Radiographic images in the form of X-ray transparencies are used to provide a high-resolution, wide dynamic range, and low cost representation of internal anatomical structure. Furthermore, the transparencies form permanent records, radiographic technology is well understood, and a large body of trained practioners can read transparencies quickly and accurately.

X-ray film has several disadvantages. Once an image has been developed on an X-ray transparency, virtually no adaptive processing can be performed on the transparency, for example, to manipulate greyscales to highlight desired areas. Re-exposure to obtain better, or different, views is undesirable in view of cost, time, and health considerations. The diagnostician, therefore, must make optimum use of a limited number of X-ray exposures when analyzing the condition of a patient.

The accuracy of reading X-ray transparencies depends upon the quality of illumination used to view the transparencies. Currently, a transparency is read by placing it on a lightbox consisting of a diffusion screen which is uniformly lit from the rear. Such lightboxes frequently cover a wall in a viewing room, and practitioners move transparencies about so that different exposures from a study can be compared with each other, or even with exposures taken from other modalities (such as an ultrasonic apparatus).

Transparency interpretation by means of a lightbox supports a simple and inexpensive diagnostic procedure, but one which suffers from a number of inadequacies related to the wide range of intensities transmitted through the transparency to the viewer. The optical transmission at each point of an X-ray transparency is measured in optical density (O.D.) units. One O.D. unit corresponds to a reduction of light intensity by a factor of 10 as the light passes through a transparency. Two O.D. units corresponds to a factor of 100 reduction in light intensity. A typical X-ray transparency may contain a range of recorded optical densities of up to 2 or 3, or even more. This means that light intensities that range over a factor of 100 to 1000 or more will be encountered when viewing a typical transparency. In the presence of such a wide dynamic range of light intensities, the human eye is unable to discriminate between all of the subtle differences inherent in the low contrast detail of film densities that must be detected in order to convey information recorded on the film to the mind of the practitioner.

Normally, the practitioner deals with the dynamic range problem inherent in X-ray transparency in a number of ways. In regions of extreme darkness, the practitioner can place the dark region of the film in front of a small bright light source in order to highlight the low contrast detail shrouded in darkness. Alternatively, the practitioner can restrict the visual field to a small region of film by looking through a long narrow tube, such as a rolled-up paper sheet. Such a tube has the effect of limiting the range of light intensities only to that occurring in the viewed region. If the range is smaller than the dynamic range present on the entire film, the practitioner will be better able to detect detail in the low frequency variation of the viewed region.

Both of these techniques simplify the visual tasks of the viewer by reducing the dynamic range of light intensities that must be viewed simultaneously. The reduced dynamic range is better matched to the capabilities of the human eye. However, these techniques, and other nonsystematic approaches to adapting viewing conditions for film interpretation are cumbersome, time consuming to implement, and are only partially effective. For all of these reasons, medical diagnosis is frequently based upon interpretation under suboptimal viewing conditions.

A better approach to this problem would be to employ a fast, automated, adaptive system of image processing that would reduce the dynamic range of light intensities presented by a given transparency to a viewer, without sacrificing the viewer's ability to detect the transparency's low contrast detail vital to accurate interpretation.

At this time, one principal mode for adaptively changing the dynamic range of an X-ray transparency image is to digitize the original image at the highest possible resolution (at least 1024×1024 pixels and up to 12 bits of greyscale) and then manipulate this representation in an image processor, and view the results on either hard copy or on a high-resolution monitor. However, these processes can be long, taking several minutes for enhancements. Further, they may alter the diagnostic environment from the familiar one of transparency viewing to an unfamiliar one of hardcopy or monitor viewing. Also a CRT monitor does not have the dynamic range of contrast that can be achieved with film. To a certain extent, this deficiency can be overcome by adaptive mapping of image contrast levels and by other techniques such as pseudo-color enhancement. However, this spatial resolution of a video monitor is limited and some image information may be lost. Although this can be alleviated somewhat by zooming and windowing of an image, the whole image cannot be seen in high resolution at once.

Therefore a primary objective of the invention is to provide for enhancement of transparency image viewing by adaptation of the transparency viewing process, rather than by substitution of another viewing process.

Another objective is to enhance the visibility of low-contrast detail in the image on an X-ray transparency through adaptation of the structure of a conventional viewing apparatus, such as a lightbox.

SUMMARY

These objectives are achieved in an apparatus and method based upon the critical observation that the benefits and advantages of image processing resulting in generation of an electronically-displayed image can be realized in the traditional lightbox structure by providing for adaptive modulation of the light used to illuminate an X-ray transparency. Such modulation is representative of an "unsharp" image derived from the image on the transparency being viewed; it consists of selective intensity modulation of the viewing light generated by the lightbox in such a manner that combination of the illumination pattern with the transparency image adjusts the large-scale contrast dynamic range of the viewed image. The varying illumination pattern enhances the visibility of low-contrast features of the viewed image. This permits an observer to read the transparency image more accurately than with conventional uniform lighting.

The invention is expressed as an apparatus for enhanced viewing of a developed image on a transparency, or the like, which includes a first image plane for positioning an image-carrying transparency for visual observation. An image detector is oriented to receive light projected through the first image plane and to produce an image signal corresponding to a developed image exposed in a transparency at the first image plane. A second image plane is provided in visual alignment with the first image plane and transparency at the first image plane is illuminated for viewing by a light source positioned for directing viewing light through the first and second image planes. An image processor is connected to the image detector and responds to the image signal by producing an unsharp representation of the developed image and an unsharp image signal corresponding to the unsharp representation. Last, a light modulator is connected to the image processor and responds to the unsharp, complementary image signal by generating at the second image plane a pattern of transmissivity corresponding to the unsharp, complementary image. The effect is to intensity modulate the viewing light by imposing on it an illumination pattern that corresponds to the negative of the unsharp image.

More broadly, the apparatus of the invention includes an image plane for positioning an image-carrying transparency for visual observation, an image detector receiving light projected through a transparency positioned at the image plane which produces an image signal corresponding to a developed image on the transparency, and unsharpening means responsive to the image signal for producing an unsharp representation of the developed image and an unsharp image signal corresponding to the unsharp representation. A source of spatially-modulated viewing illumination in alignment with the image plane, is connected to the unsharpening means for producing an illumination pattern corresponding to the unsharp image and directed to the image plane for illuminating the transparency.

In a particular embodiment, the apparatus includes a viewing apparatus enclosure, a first image plane in the enclosure for positioning an image-carrying transparency for visual observation, and a second image plane in visual alignment with the first image plane. A light source is positioned in the enclosure to project light including viewing light through the first and second image planes. A modulation is provided at the second image plane which responds to an image on a transparency at the first image plane by producing a transmissivity pattern at the second image plane which corresponds to an unsharp, complementary representation of said image.

The invention is also expressed as a method for enhanced viewing of a developed image in a transparency or the like by means of a viewing apparatus having first and second image planes and a means for projecting viewing light through said first and second image planes. The method embraces the steps of positioning a transparency with a pattern of optical transmissivity defining a developed image at the first image plane and then receiving light which illuminates the transparency and generating an image signal corresponding to the developed image. Next, viewing light is projected through the first and second image planes, and, while the viewing light is projected, the viewing light is modulated with a physical pattern of transmissivity generated at the second image plane in response to the image signal, the physical pattern of transmissivity being an unsharp representation of the developed image.

The method is also summarized as a method for enhanced viewing of a developed image on a transparency or the like in an apparatus having an image plane for viewing the transparency and a means for projecting spatially uniform viewing light through the image plane, the method including positioning a transparency with a pattern of optical transmissivity defining a developed image at the image plane and generating from the developed image a signal corresponding to an unsharp, complementary representation of the developed image. Then, in response to the signal, the intensity of the viewing light is modulated with the unsharp image representation to produce a pattern of spatially varying illumination directed toward and aligned with the transparency at the image plane.

Incorporation of the apparatus and method of the invention into standard arrangements and techniques for visual interpretation of transparencies by an observer achieves the objectives stated above, as well as other objectives and advantages which will become more evident when the following detailed description is read with reference to the drawings, in which.

DETAILED DESCRIPTION OF THE PREFERRED EMBODIMENT

In the following, reference is made to inspection or viewing of a lit or illuminated transparency. In this regard, the frame of reference for these terms is found in the conventional X-ray transparency "lightbox". A lightbox characteristically is a square or rectangular housing having a flat, translucent diffusion screen upon which X-ray transparencies are mounted. A transparency is illuminated by means of a light source providing illuminating light from a location behind the screens within the lightbox. The illumination is directed from within the lightbox to the diffusing screen. Significantly, it has been considered highly desirable for the illuminating light to exhibit spatial uniformity, in order to evenly illuminate the transparency. The transparency is read or viewed from a position on the opposite side of the diffusing screen from the light source.

Figure 1:
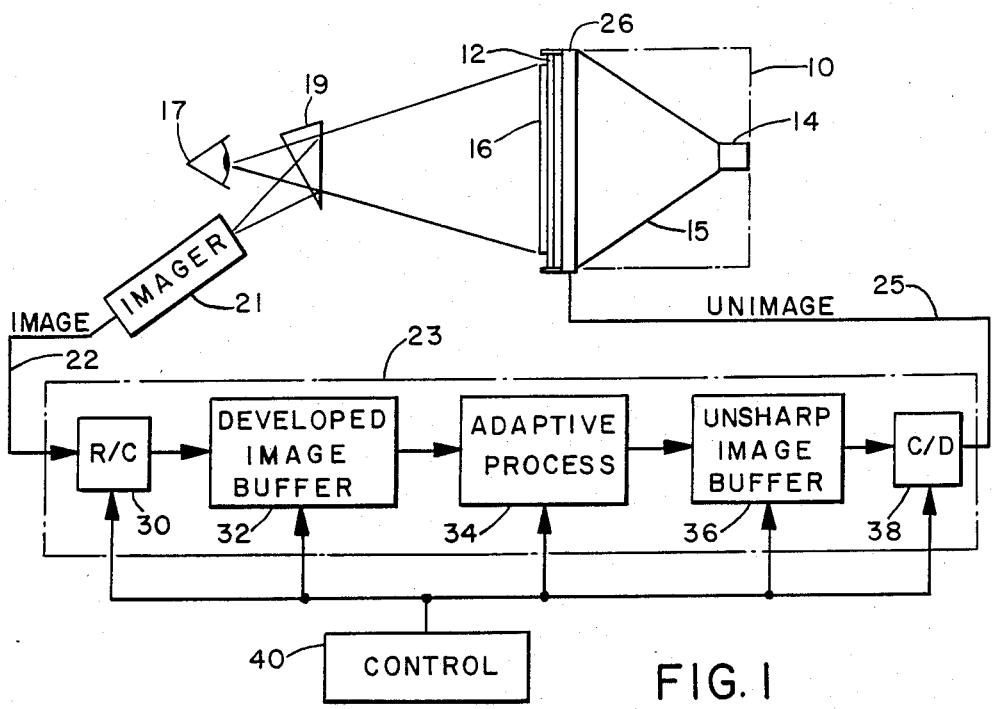
FIG. 1 is a block diagram illustrating a basic functional arrangement of components for viewing a transparency image lit by illumination having a spatially varying pattern.

FIG. 1 illustrates, in block diagram form, a basic complement of elements necessary to understand and practice the invention with a lightbox. In FIG. 1, a lightbox apparatus which enhances image viewing by modulating the viewing illumination of a transparency includes a lightbox enclosure, or equivalents, 10 on which is mounted a first image plane 12 in the form of a diffusing screen. A source 14 of visible light produces an illumination 15. A transparency 16 in the form of, for example, an exposed X-ray film upon which an image has been developed by a conventional developing process is releasably mounted by conventional means on the diffusing screen at the image plane 12. When the light source 14 is turned on, the illumination 15 is projected toward, and diffused by, the diffusing screen at the image plane 12, the diffused illumination then passing through and illuminating the X-ray transparency 16. An observer standing at viewing location 17 receives the illumination, modulated by the image on the transparency 16 for detection and analysis of the image.

In the invention, an electro-optical modulation loop, includes an imager 21, an image processor 23, and a spatial light modulator 26 located at a second image plane in optical alignment with the first image plane 12 and the imager 21. The imager 21 detects the image on the transparency 16, and converts the detected image by a conventional scanning process into an IMAGE signal output on signal line 22. The IMAGE signal is passed to the processor 23, preferably an image processor, which produces an unsharp representation of the image on the transparency 16. The unsharp representation is provided, in the form of an unsharp image (UNIMAGE) signal on a signal line 25. The UNIMAGE signal on signal line 25 is fed to the control input of the spatial light modulator 26, which operates conventionally to modulate the unmodulated, spatially uniform illumination 15.

In the art of image processing, "unsharp imaging" is the process of obtaining a derived image representation from an original image representation by a process of spatial averaging. The spatial averaging process effectively removes variations in contrast which are smaller than the characteristic size of the averaging operator. "Unsharp masking" may be performed by conventional electronic means through the subtraction of the derived image from the original image, with the resulting image representation being viewed on a display device. In the resulting image, the suppression of large variations in contrast effectively enhances the display of smaller contrast fluctuations. In the class of enhancements which involve unsharp masking, the resulting image will have less low spatial frequency content than the original image.

The invention deviates novelly from the conventional means of unsharp masking by adaptively imposing on the viewing illumination 15 in the lightbox 10 of FIG. 1, a modulation in the form of the complement of the derived (unsharp) image. Instead of combining the original and unsharp images by electronic processing, and then displaying the result by hardcopy or electronic means, the invention effects a spatial combination of original and unsharp images in an adaptive manner that retains and vastly improves the conventional lightbox technology.

The basis of the invention can be understood with reference to FIG. 1. In FIG. 1, the imager 21 receives, by conventional optical means 19 illumination from the lightbox 10 and develops, on its face place, an image of the transparency 16. The image on the transparency is scan converted, using conventional scan-conversion techniques, into the IMAGE signal. The IMAGE signal is fed on signal line 22 to receive/conversion circuitry (R/C) 30, which adapts the IMAGE signal for the processor 23. Such conversion can be, for example, analog-to-digital conversion, which converts the IMAGE signal into a string of picture elements (pixels). The pixels may be represented by individual bits, or by multi-bit words which signify instantaneous quantized values of the analog form of the IMAGE signal, and which provide virtually continuous intensity variation representation of the image on the transparency 16.

The pixels are fed by the R/C circuitry 30 to a conventional input frame buffer 32 in which the digitized representation of the image is stored in a conventional scanned format. Once the IMAGE signal is converted and buffered, it is fed conventionally to an adaptive process 34, which develops the unsharp representation of the transparency image by any of a number of conventional unsharpening procedures or algorithms. See, for example, the adaptive filtration procedure described for CRT viewing of radiographic images of the chest in the article "Implementing Adaptive Filtration for Digital Chest Imaging", by McAdams et al. in Optical Engineering, 26(7), 669-674, (July 1987). See also Hier et al, U.S. Pat. No. 4,667,304, which is incorporated herein by reference.

The unsharp image developed by the adaptive process 34 is fed to an output buffer 36, and therefrom through conversion and drive circuitry (C/D 38) as the UNIMAGE signal. At the output of the processor 23, the UNIMAGE signal may have the form of a digitized representation of the unsharp image in a conventional scanned format. In this form, the UNIMAGE signal is effective to configure and maintain the transmissivity of the spatial light modulator 26.

Spatial light modulators are known in the art. Such a device may be, for example, a liquid crystal "light valve" or equivalent. As is known, such light valves are used in computer terminal displays and in digital wrist watches.

Additionally, the light box 14 may include a set of projection lenses (not shown) which focus the viewing illumination onto the first image plane 12. Such lensing would also equalize the field of view of the spatial light modulator 26 to the size of the transparency 16 through appropriate magnification.

The imager 21 is used to monitor the amount of light that is projected through the transparency 16. The imager is scanned in order to record the light pattern emitted through the transparency, which carries the image. The imager can be a standard video camera, for example, or a single (or multiple) element photodiode that views the entire transparency. In this latter case, the image could be scanned to the imager with the spatial light modulator 26, by allowing only one element at a time to be transparent to light and moving the position of this element in a raster fashion over the entire transparency.

The apparatus of FIG. 1 operates by, initially, turning the spatial light modulator 26 "off". In this state it is completely transparent to light. The spatially uniform light is then projected through the diffuser at the first image plane 12 and the transparency 16. The imager 21 scans the image on the transparency 16 and outputs the IMAGE signal. The output of the imager 21 is used to compute an optical transmissivity pattern, which also may be referred to as a "density pattern", to be generated by the spatial light modulator 26 and thereby projected onto the transparency 16 in order to produce an enhanced image for viewing.

Figure 2:
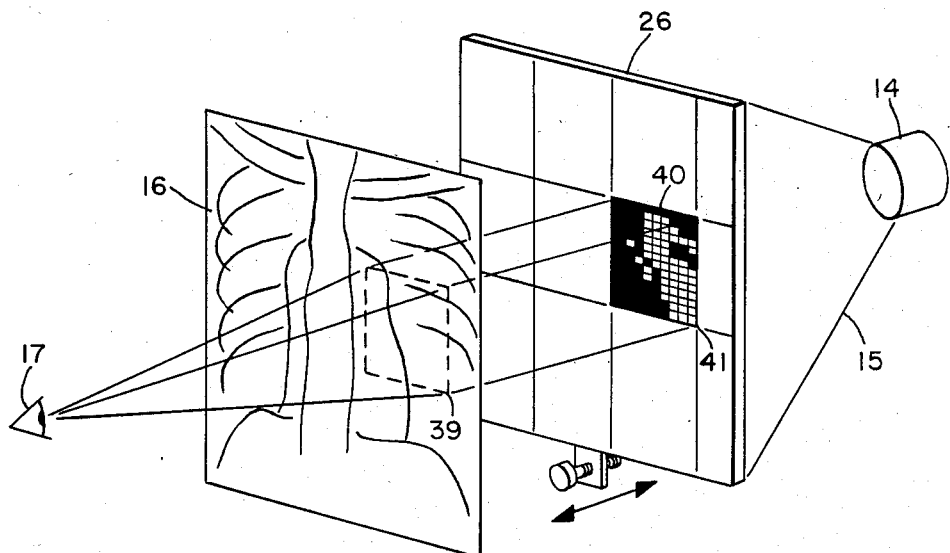
FIG. 2 is a block diagram illustrating the illumination of a transparency with light having a spatially varying pattern corresponding to an unsharp representation of an image on the transparency.

The relationship of the viewed image on the transparency 16 to the unsharp image embedded in the transmissivity pattern of the spatial light modulator 26 can be appreciated with reference to FIG. 2. In FIG. 2, the spatial light modulator carries an unsharp image consisting of the negative of the smeared version of the image on the transparency 16. In FIG. 2, the transparency 16 has an X-ray image of a chest. The intensity variation over the entire image affects the viewing of the low contrast detail in areas of the image such as the area 39. The low contrast detail of the image is enhanced by providing a matrix of cells such as the cell 40 in the spatial light modulator which corresponds to image area 39. In FIG. 2, the sizes of the cell 40 and image area 39 are greatly exaggerated to assist the reader's understanding. In the cell 40, an attenuation pattern is set to provide a complementary representation of the average intensity of the image area 39. This will modulate the average intensity of the portion of the viewing light 15 which illuminates the area 39. The effect in the eye of the viewer at location 17 is to subtract an unsharp image from the sharp image and thereby to reduce the large-area intensity variation to the benefit of low-contrast detail. The entire image is enhanced in this manner by provision of a continuous, two-dimensional array of cells in the spatial light modulator, which corresponds to the array of image areas into which the image is divided by the adaptive process 34. In the adaptive process 34, the unsharp image can be rendered in the form of the regular matrix of picture elements (pixels) which are arranged in a rectangular array of cells, each cell containing M pixels, m of which are turned "on" while the rest are "off". In this regard, a pixel being "on" signifies that the pixel is transparent and has a transmissivity of 1.0. When "off" a pixel is assumed to be less than wholly transparent, that is, its transmissivity (t) is such that t<1.0. Thus the mean transmission (T) of the cell is given by:

$$T = [m + (M-m)t]/M \tag{1}$$

In order to build an acceptable unsharp image, m is chosen on the basis of the mean optical densities of the transparency imaged by the imager 21, averaged over areas corresponding to the cell size of the unsharp image. The mean transmission $(T_I)$ through the transparency is related to the mean optical density, x, of the transparency according to:

$$T_I = 10^{-x} \tag{2}$$

The condition for mask equalization to effect total unsharp mask subtraction is:

$$(T)(T_I) = K \; tm \tag{3}$$

Where K is a constant, and it is assumed that the binary pixel pattern and artifacts arising from discrete cell size are blurred by the diffusing screen at the first image plane 12 before acting as an unsharp image.

To choose the relationship between m and x, equations (1) and (2) are substituted into equation (3):

$$([m + (M-m)t]/M)(10^{-x}) = 10^{-x(max)} \tag{4}$$

Where K is chosen to be the transmission through the densest region of the image on the transparency, that is, $K = 10^{-x(max)}$, where x(max) is the maximum optical density of the transparency. Solving equation (4) for m gives:

$$m = [M(10^{(x-x(max))}) - Mt]/(1-t) \tag{5}$$

In FIG. 2, the transparency 16 with a chest image is illustrated in optical alignment with the spatial light modulator 26, on which a pattern of transmissivity has been established, the pattern corresponding to an array of cells, such as the cell 40 each having a mean transmission (T) as per equation (1). Each cell is composed of a square or rectangular array of individually X-Y addressable pixels, such as the pixels 41 forming the cell 40. Each pixel is binary, as assumed by equations (1-5). The unsharp image buffer 36 in the processor 23 has an array of binary values stored in a matrix format corresponding to the pixel matrix of the spatial light modulator 26. The binary signals in the buffer 36 are set by the result of the adaptive unsharpening process 34 (embodied, for example in equations (1)-(5)) to values corresponding to the unsharp image produced by the process 34. In a two-dimensional array, the binary signals in the image buffer 36 are conventionally converted to X-Y control signals which are fed to corresponding horizontal and vertical signal lines which control the configuration of the pixel array in the spatial light modulator 26.

As seen in FIG. 2, the unsharp image represented by the pattern of optical attenuation in the spatial light modulator 26 forms a binary, pixelated mask. The location of the mask between the transparency 16 and the light source 14 acts to spatially modulate the uniform illumination wavefront 15. If the transparency 16 were removed from image plane 12, the diffusing screen at the image plane would filter the optical density variations of the mask and thereby effectively soften and blur its appearance at the image plane. When the transparency 16 is viewed at the location 17 after set up of the spatial light modulator with the unsharp image, the modulated viewing light projected through the first image plane effectively mixes the unsharp and sharp images. Since the unsharp image is the complement of the image on the transparency, the low spatial frequencies represented by the unsharp image are removed from the transparency image. The result, apparent at location 17, is to increase the visibility of low contrast details, and to reduce levels of extraneous optical glare on the perceived (mixed) image. The enhancement preserves the spatial resolution in the perceived image, and also preserves access to the original, unprocessed transparency.

Considering FIGS. 1 and 2 together, additional features which enhance the operation and performance of the basic apparatus thus described include a control mechanism 40 which initiates and synchronizes the operations of the components of the processor 23. Such control permits an operator to reinitiate the process by blanking the spatial light modulator 26 to make it transparent while the transparency image is being acquired by the imager 21 and subjected to the processor 23. This is necessary if the transparency is moved during viewing, in which case a new unsharp image mask must be acquired. A simple reset button for this task (not illustrated) is provided in the control mechanism 40. Once the image has been acquired by the imager 21, converted, buffered, and processed, the unsharp image signal array is stored in the buffer 36 to maintain the drive signals necessary to retain the unsharp image configuration of the spatial light modulator 26 for the duration of transparency viewing.

In addition, a positioner 42 permits adjustment of the location of the spatial light modulator 26 along the viewing axis through the transparency 16, the modulator 26, and the light source 14. The effect of decreasing the distance between the modulator 26 and the transparency 16 will be to sharpen the shadow image cast upon the diffusing screen, in effect sharpening the unsharp image. Conversely, movement of the modulator away from the transparency on the viewing axis will have the effect of lessening the sharpness of the unsharp image. In view of this optical defocusing the electro-optical processing loop which controls the configuration of the spatial light modulation 26 may be simplified by eliminating the unsharpening procedure implemented by the process 34.

Figure 3:
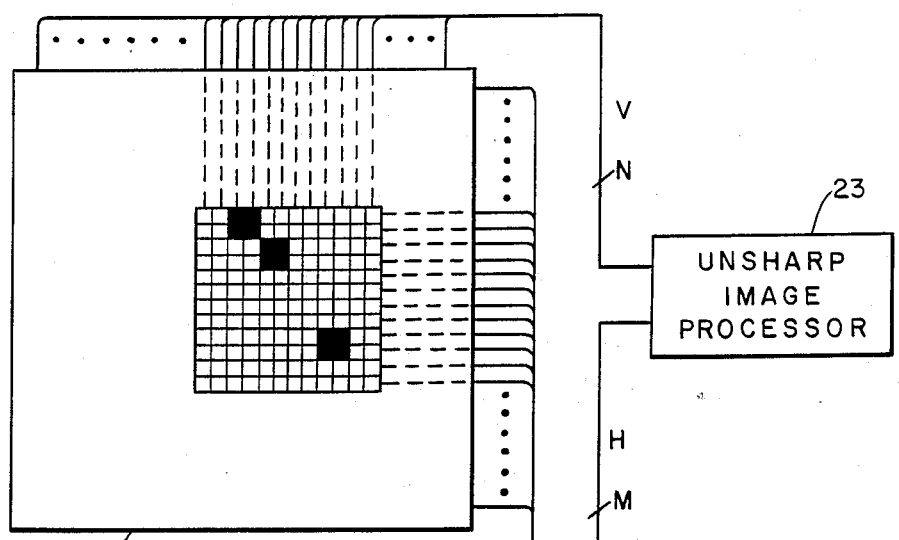
FIG. 3 illustrates the arrangement of a spatial light modulator under the control of an image processor for imposing a spatially-varying pattern on transparency illumination.

A front view of the spatial light modulator 26 is illustrated in FIG. 3. The spatial light modulator 26 is represented by conventional X-Y controllable screens such as are commonly used for portable computer displays such as the Toshiba models T-1000 and T-1200, the Zenith Z-183, and Kaypro 2000+, among others. As is known, these displays utilize super twist birefringence effect (SBE) liquid crystal display (LCD) devices comprising regular, two-dimensional arrays of binary pixels. The transmissivity of any pixel in the array is conditioned by the states of a pair of signals, termed vertical (V) and horizontal (H), which are provided on corresponding signal leads of the modulator. For an N by M array of pixels, N vertical (V) and M horizontal (H) control lines would be provided. The drive signals for the modulator 26 are conventionally derived from the unsharp image in the buffer 36 of the processor 23. Those skilled in the art will appreciate that other types of spatial light modulation, including greyscale modulation, may be used in the invention.

Figure 5:
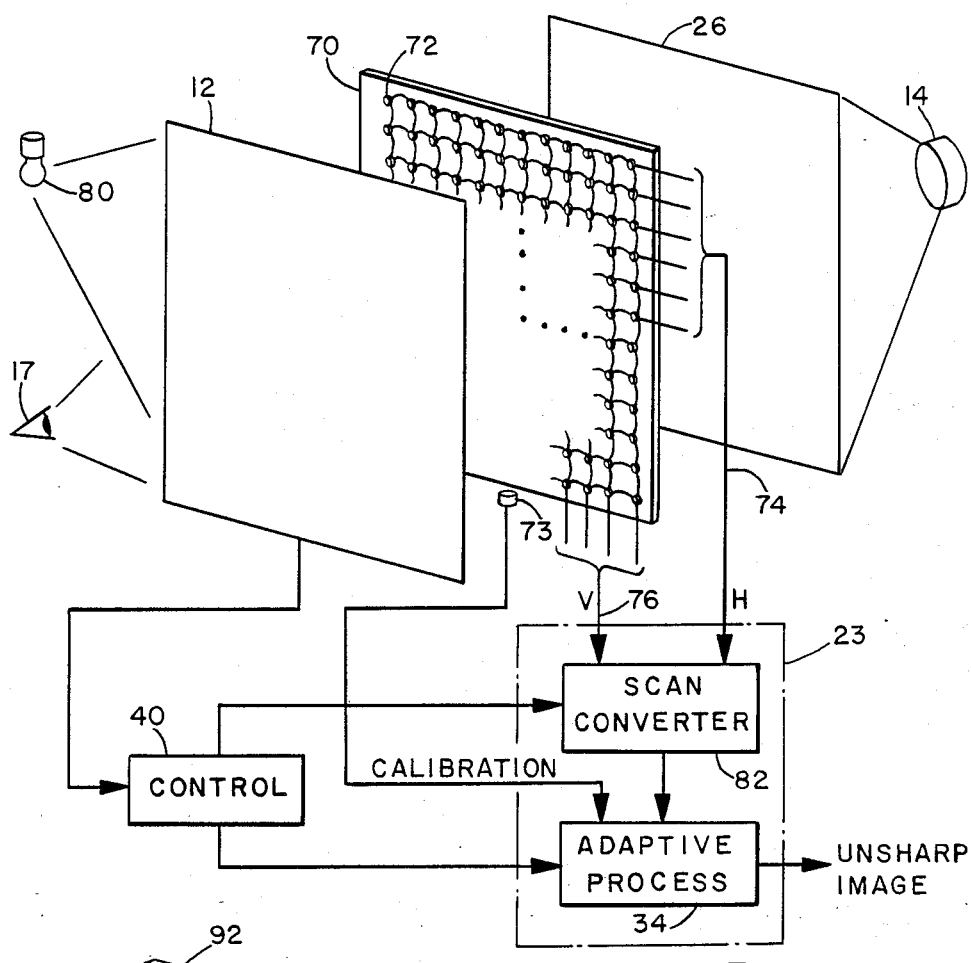
FIG. 5 illustrates an arrangement for detecting a transparency image.
Figure 6:
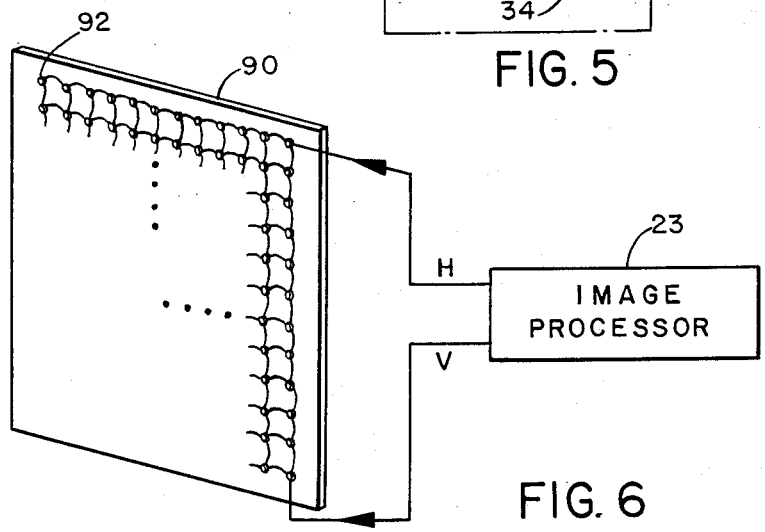
FIG. 6 illustrates an arrangement for directly modulating a viewing illumination source to impose a spatially-varying pattern on transparency illumination.

With the fundamental practice of the invention described above, enhancements to its embodiment illustrated in FIG. 1 can be appreciated with reference to FIGS. 5 and 6. In FIG. 5, an arrangement for obtaining an image signal for submission to the adaptive process 34 in real time is illustrated. In the arrangement of FIG. 5, a transparent image plane 70 is positioned between the first image plane 12 and the second image plane occupied by the spatial light modulator 26. The image plane 70 comprises a plurality of photodetectors, such as photodiodes, one indicated by reference numeral 72, which are arranged in a regular, two-dimensional matrix with horizontal (H) control lines which are indicated by reference numeral 74 and vertical (V) control lines which are indicated by reference numeral 76. A light source 80 emitting radiation to which the photodetectors 72 respond is positioned so that it illuminates the transparency from the side observed from the viewing position 17. The illumination of the image by the light source 80 casts a representation of the image on the image plane 70. The image on the image plane 70 is provided to the processor 23 by conventionally scanning the array of photodetectors 72 by available circuitry represented by a scan converter 82 to which the horizontal and vertical control lines 74 and 76 are connected. In a particular instantiation of the arrangement of FIG. 5, the light source 80 can be, for example, an infrared source and the detectors 72 conventional semiconductor photodiodes, which respond to illumination in the infrared region. Alternatively, the photodetectors 72 can respond to visible light cast back into the lightbox from ambient external sources. One calibration photodetector 73 may be positioned to sense the level of ambient background radiation, in order to establish a reference level for conversion of the individual photodiode signals provided by photodiode 72.

The arrangement of FIG. 5 eliminates the requirement for an imager and for an input imager buffer. In this regard, a representation of the original transparency image is continuously sensed and provided by the array of photodetector 72, which can be sampled periodically to develop the unsharp image signal produced by the adaptive process 34.

It should be evident that the diffusing screen at the first image plane 12 will effectively filter out the image of the array of photodetectors 72 produced by illumination of the image plane 70 by the viewing illumination 15. The individual photodetectors at the image plane 70 represents relatively high-frequency spatial modulation of the viewing illumination 15, which lies outside the passband of the low frequency filtration provided by the diffusing screen at the first image plane 12. Therefore, the detector array at the image plane 70 will not cast a discernible shadow, or otherwise affect the light transmitted through the diffusing screen.

In operation, in the configuration of FIG. 5, the light source 14 is initially off. The operator places a transparency on the image plane 12 which is sensed conventionally by the control mechanism 40. This automatically activates the detector array at the image plane 70. Since the light entering the lightbox through the first image plane 12 is modulated by the transparency, the array of photodetectors 72 acquires sufficient data to generate an unsharp image corresponding to the one on the transparency. It will be evident that each photodetector senses a respective portion of the image on the transparency. The detector converts the average intensity to an electrical signal logarithmically related to the average intensity of the viewed image portion. The two-dimensional array spatially integrates the fields of view of the individual photodetectors into a representation of the transparency image which is already defocused, or unsharpened, to a certain extent. It will be evident to those skilled in the art that the degree of unsharpening is related to the number of photodetectors and to the distance between the first image plane 12 and the image plane 70 occupied by the photodetector array. The processor 23 is left in the control loop between the detector array at the image plane 70 and the spatial light modulator 26 to perform three functions: scan conversion of the array of electrical signals produced by the photodetectors 72, further unsharpening of the image obtained from the photodetector array (if desired), and conversion and maintenance of the V and H drive signals which configure the transmissivity pattern of the spatial light modulator 26.

Provision of a calibration photodetector 73 which senses the unmodulated light entering the lightbox from the outside permits normalization of the electrical signals produced by the array of photodetectors 72. Further, available photodetectors suitable for use at the image plane 70 are sufficiently sensitive to operate in response to background light from normal viewing rooms from which the lightbox would be used. As is known, such photodetectors come with encapsulated lenses to provide for selective orientation of their fields of view toward the first image plane 12. Thus, a photodetector at the image plane 70 can be made insensitive to the viewing illumination 15, and thus operate continuously. This will continuously provide an unsharp image representation to the processor 23, which allows instantaneous updating in the event that the transparency at the first image plane is moved. The photodetector 72 can be additionally densitized to the viewing illumination 15 by further shielding and by addition of spectral filters with or without an extra light source in the viewing area outside the lightbox. This would further enhance the ability of the arrangement of FIG. 5 to operate without interrupting the viewing illumination 15.

The modification of FIG. 6 is represented by the substitution of a relatively dense regular, two-dimensional matrix 90 of miniature incandescent sources in place of the light source 14 in the lightbox. The light source array 90 consists of individual light sources 92 which are conventionally wired in an X-Y manner to provide for selectable individual control of each light. Thus, the lights 92 can be operated to reproduce the unsharp image in response to the unsharp image signal generated by the image processor 23. In this configuration, the need for a spatial light modulator is obviated since the light source can be directly modulated by the unsharp image signal.

Figure 4:
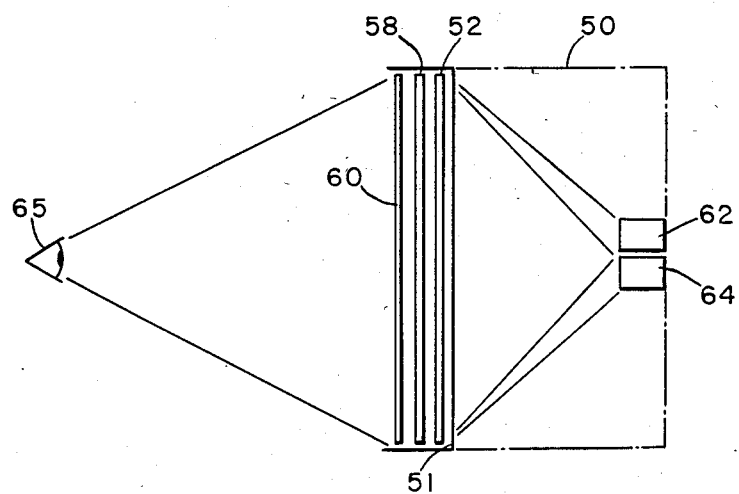
FIG. 4 is a second embodiment of the apparatus of the invention which uses ultraviolet components to spatially modulate visible light during illumination of a transparency.

FIG. 4 illustrates an alternative embodiment of the subject invention in which a light box 50 has a first image plane 51 in the form of a diffusing screen on which an X-ray transparency 52 is placed for viewing. In the second embodiment, a sheet or plate of photochromic material 58 is held in alignment with the transparency 52 by the film holder on the lightbox 50 and is sandwiched between the transparency 52 and an ultraviolet (UV) filter 60. Two light sources 62 and 64 are provided in the lightbox 50, with the light source 62 comprising a source of UV radiation, while the source 64 provides spatially uniform visible light. In the embodiment of FIG. 4, the photochromic sheet 58 exhibits a transmissivity in the visible range of light which is inversely proportional to the intensity of UV radiation falling on the sheet. In operation, when the UV light source 62 illuminates the image on the transparency 52, the separation of the transparency 52 and film 58 and the thickness of the plate 58 defocus the UV-illuminated image, with the defocused UV-image establishing a pattern of visible transmissivity on the film 58 corresponding to, and in alignment with the image on the transparency 52. The defocused image corresponds essentially to the unsharp image representation obtained by processing in the embodiment of FIG. 1. Further, since the transmissivity of the photochromic film 58 is inversely proportional to the intensity of the Uv illumination, the defocused image on the film 58 is the photographic negative of the image on the transparency 52. Now, a viewer standing at observation location 65 will perceive an image resulting from the mixing of the unsharp image on the photochromic film 58 with the image on the transparency 52, with the enhancement of low-contrast detail in the transparency image which is enjoyed in the practice of the embodiment of FIG. 1. Photochromic material sheets satisfying the requirements of this embodiment are available in the form of glass sheets from the Dow-Corning Company.

Obviously many variations of the embodiments and methods disclosed herein may be made. These variations will be evident to those skilled in the art and can be practiced without deviating from the spirit of the invention described or the scope of the claims appended.

We claim:

1. An apparatus for enhanced viewing of a developed image on a transparency or the like, comprising:

a first image plane for positioning an image-carrying transparency for visual observation;

an image detector for receiving an image from a transparency at said first image plane and producing an image signal corresponding to said image;

a second image plan in optical alignment with said first image plane;

a light source means positioned with respect to said first and second image planes for projecting viewing light through said first and second image planes;

an image processor connected to said image detector and responsive to said image signal for producing an unsharp representation of said developed image and an unsharp image signal corresponding to said unsharp representation; and a light modulator connected to said image processor and responsive to said unsharp image signal for generating at said second image plane a pattern of attenuation corresponding to said unsharp image.

2. The apparatus of claim 1 further including an observation location for viewing an image combining a developed image positioned at said first image plane and an unfocused image generated at said second image plane, and wherein said first and second image planes are situated between said observation location and said light source means.

3. The apparatus of claim 1 wherein said light modulator is a spatial light modulator and said second image plane is between said light source means and said first image plane.

4. The apparatus of claim 3 wherein said spatial light modulator is in the form of an $A \times B$ matrix of individual cells, each of said cells having a selectively variable transmissivity.

5. The apparatus of claim 1 wherein said unsharp representation includes an image representation comprising an optical density pattern representative of a predetermined portion of said developed image, said optical density pattern corresponding to a complementary representation of a transmissivity variation in said predetermined portion.

6. The apparatus of claim 5 wherein said light modulator is a two-dimensional spatial light modulator having a transmissivity which is selectably variable at each of a plurality of arrayed locations.

7. The apparatus of claim 6 wherein said two-dimensional spatial light modulator is a liquid crystal device having a matrix of optically transmissive, binary pixels, each said pixels having an "on" state with a transmissivity of substantially 1.0 and an off state with a transmissivity, t, of less than 1.0, and wherein said density pattern corresponds to a cell consisting of a two-dimensional array of said pixels, said cell having a transmission T determined by:

$$T = [m + (M-m)t]/M$$

where m is the number of pixels in said cell in the on state and M is the total number of pixels in said cell 8. A method for enhanced viewing of a developed image in a transparency or the like by means of a viewing device having a first and second image plane and means for projecting viewing light for viewing said image, said method comprising the steps of:
- positioning a transparency with a developed image at said first image plane;
- receiving light illuminating said transparency and generating an image signal corresponding to said developed image;
- projecting said viewing light through said first and second image planes; and
- while projecting said viewing light, and in response to said image signal, generating an optical attenuation pattern at said second image plane, said optical attenuation pattern being an unsharp complementary representation of said developed image.

9. A method for enhanced viewing of a developed image on a transparency or the like in an apparatus having an image plane for viewing said transparency and a means for projecting spatially uniform viewing light through said image plane, comprising the steps of:
- positioning a transparency with a developed image at said image plane;
- generating from said developed image an optical pattern corresponding to an unsharp representation of said developed image; and
- modulating the intensity of said viewing light with said optical attenuation pattern.

10. An apparatus for enhanced viewing of a developed image on a transparency, or the like, comprising:
- a viewing apparatus enclosure;
- a first image plane in said enclosure for positioning an image-carrying transparency for visual observation;
- a second image plane in optical alignment with said first image plane;
- a light source in said enclosure for projecting viewing light from within said enclosure through said first and second image planes for viewing an image on a transparency positioned at said first image plane; and
- modulation means responsive to illumination of said image for deriving a complementary, unsharp image representation of said image from said illumination and for intensity modulating said viewing light at said second image plane with said unsharp image representation.

* * * * *